(12) United States Patent
Takao (10) Patent No.: US 8,579,513 B2
(45) Date of Patent: Nov. 12, 2013

(54) SLIDE MEMBER AND BEARING UTILIZING THE SAME

(75) Inventor: Minoru Takao, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 828 days.

(21) Appl. No.: 12/439,356

(22) PCT Filed: Jul. 25, 2007

(86) PCT No.: PCT/JP2007/000795
§ 371 (c)(1),
(2), (4) Date: Feb. 27, 2009

(87) PCT Pub. No.: WO2008/032427
PCT Pub. Date: Mar. 20, 2008

(65) Prior Publication Data
US 2009/0238508 A1    Sep. 24, 2009

(30) Foreign Application Priority Data
Sep. 13, 2006 (JP) ................................. 2006-248024

(51) Int. Cl.
*F16C 33/32* (2006.01)
(52) U.S. Cl.
USPC .......................................... 384/492; 501/97.2
(58) Field of Classification Search
USPC ............................. 384/492, 279, 902, 907.1; 501/97.2–97.4
See application file for complete search history.

(56) References Cited

U.S. PATENT DOCUMENTS

| | | | |
|---|---|---|---|
| 5,369,065 A * | 11/1994 | Yoshimura et al. | 501/97.4 |
| 5,439,856 A | 8/1995 | Komatsu | |
| 5,695,700 A * | 12/1997 | Takeuchi et al. | 264/626 |
| 5,698,896 A | 12/1997 | Komatsu et al. | |
| 5,780,374 A * | 7/1998 | Kawai et al. | 501/97.1 |
| 6,242,374 B1 | 6/2001 | Komatsu | |
| 6,784,131 B2 * | 8/2004 | Komatsu et al. | 501/97.1 |
| 7,056,850 B2 | 6/2006 | Komatsu | |
| 2002/0136908 A1 | 9/2002 | Komatsu et al. | |

FOREIGN PATENT DOCUMENTS

| | | |
|---|---|---|
| EP | 0 587 119 A2 | 3/1994 |
| EP | 0 660 397 A2 | 6/1995 |
| EP | 0 778 249 A1 | 6/1997 |
| EP | 0 963 966 A1 | 12/1999 |
| EP | 1 223 150 A2 | 7/2002 |
| JP | 6-135771 A | 5/1994 |
| JP | 7-187793 A | 7/1995 |
| JP | 2000-34172 A | 2/2000 |

(Continued)

*Primary Examiner* — Michael P Ferguson
*Assistant Examiner* — Daniel Wiley
(74) *Attorney, Agent, or Firm* — Foley & Lardner LLP (57) ABSTRACT

A sliding member includes a silicon nitride sintered compact containing a rare earth element of 7 to 18 mass % in terms of oxide and at least one element M selected from Ti, Zr, Hf, V, Nb, Ta, Cr, Mo and W of 0.1 to 3 mass % in terms of oxide, and having a total content of impurity positive ion elements of 0.3 mass % or less and a thermal conductivity of 60 W/m·K or higher. The silicon nitride sintered compact includes silicon nitride crystal grains and a grain boundary phase, and has a ratio of crystalline compound phases in the grain boundary phase of 20% or more in area ratio, and an average grain size of the crystalline compound phases of 0.5 μm or less. The sliding member is used, for example, as a bearing ball 2.

15 Claims, 1 Drawing Sheet

(56) References Cited

FOREIGN PATENT DOCUMENTS

| JP | 2002-326875 A | 11/2002 |
| JP | 2003-34581 A | 2/2003 |
| JP | 2004-2067 A | 1/2004 |
| JP | 2006-36554 A | 2/2006 |

* cited by examiner

SLIDE MEMBER AND BEARING UTILIZING THE SAME

TECHNICAL FIELD

The present invention relates to a sliding member and a bearing using the same.

BACKGROUND ART

Sliding members are used in various fields such as bearing member, rolling roll material, vane for compressor, gas turbine blade, cam roller and so on. For the sliding members, a ceramic material that is lightweight and has high strength is increasingly used. In particular, a silicon nitride sintered compact is excellent in mechanical strength and abrasion resistance and therefore progressively applied to bearing members such as a bearing ball.

For the bearing members such as the bearing ball and so on using the silicon nitride sintered compact, it has been proposed to improve the sliding characteristics represented by the mechanical strength and rolling life, for example, based on control of the sintered compact composition (the kinds, the addition amounts and so on of sintering aids), control of forms of the aid components in the sintered compact, control of manufacturing process and so on (see Patent References 1 and 2). Patent Reference 1 describes a silicon nitride sintered compact containing, as sintering aids, rare earth elements of 2 to 10 mass % in terms of oxide, spinel of 2 to 7 mass %, silicon carbide of 1 to 10 mass %, and at least one kind selected from among Ti, Zr, Hf, W, Mo, Ta, Nb and Cr of 5 mass % or less in terms of oxide.

Incidentally, in electronic equipment having a disk medium such as an HDD, DVD or the like, its rotation shaft is rotated at a high speed by a spindle motor to work the disk mounted on the rotation shaft. It is tried that a bearing ball made of the silicon nitride sintered compact that is lightweight and has excellent abrasion resistance is applied to a bearing of the rotation shaft rotated at a high-speed. However, the bearing ball made of the silicon nitride sintered compact is inferior in thermal conductivity to a conventional bearing ball made of metal, and therefore has a drawback of being incapable of efficiently releasing heat generated by the high speed rotation of the rotation shaft to the outside.

Further, it has also been tried that the thermal conductivity of the silicon nitride sintered compact is enhanced (see Patent References 3 and 4), but only the enhancement of the thermal conductivity may sacrifice the sliding characteristics. On the other hand, for the silicon nitride sintered compact used for amounting board and a heat sink of various electronic parts, a silicon nitride sintered compact enhanced in thermal conductivity by using a silicon nitride powder having reduced oxygen content and reduced amount of impurity positive ion elements has been proposed (see Patent Reference 5). However, the silicon nitride sintered compact for electronics parts that is applied to the mounting board and heat sink does not have sufficient abrasion resistance. Therefore, the silicon nitride sintered compact for electronic parts cannot be directly applied to the sliding members such as the bearing member and so on.

Patent Reference 1: JP-A 2003-034581(KOKAI)
Patent Reference 2: JP-A 2006-036554(KOKAI)
Patent Reference 3: JP-B 3445342 (Patent Publication)
Patent Reference 4: JP-A 2000-034172 (KOKAI)
Patent Reference 5: JP-A 6-135771 (KOKAI)

DISCLOSURE OF THE INVENTION

An object of the present invention is to provide a sliding member enhanced in thermal conductivity while maintaining the abrasion resistance and sliding characteristics which are inherent in a silicon nitride sintered compact, and a bearing using the same.

A sliding member according to an aspect of the present invention includes a silicon nitride sintered compact containing, as sintering aids, a rare earth element of 7 to 18 mass % in terms of oxide and at least one element M selected from Ti, Zr, Hf, Mg, V, Nb, Ta, Cr, Mo and W of 0.1 to 3 mass % in terms of oxide, and having a total content of Li, Na, K, Ca, Sr, Ba, Fe, Mn and B as impurity positive ion elements of 0.3 mass % or less, wherein the silicon nitride sintered compact includes silicon nitride crystal grains and a grain boundary phase, and has a ratio of crystalline compound phases in the grain boundary phase of 20% or more in area ratio, an average grain size of the crystalline compound phases of 0.5 μm or less, and a thermal conductivity of 60 W/m·K or higher.

A bearing according to an aspect of the present invention includes a rolling element composed of the sliding member according to the aspect of the present invention.

EXPLANATION OF CODE

1 . . . bearing, 2 . . . bearing ball, 3 . . . inner ring, 4 . . . outer ring

BEST MODE FOR CARRYING OUT THE INVENTION

Hereinafter, an embodiment of the present invention will be described. A sliding member according to the embodiment of the present invention includes a silicon nitride sintered compact containing a silicon nitride as a main component, and a rare earth element of 7 to 18 mass % in terms of oxide and at least one element M selected from Titanium (Ti), zirconium (Zr), hafnium (Hf), magnesium (Mg), vanadium (V), niobium (Nb), tantalum (Ta), chromium (Cr), molybdenum (Mo) and tungsten (W) of 0.1 to 3 mass % in terms of oxide, as sintering aids.

The silicon nitride sintered compact may further contain aluminum in an amount of 0.3 to 4 mass % in terms of oxide as a sintering aid. The rare earth element and aluminum form a grain boundary phase composed of, for example, Si—R—Al—O—N compound (R: rare earth element) to thereby contribute to densification of the sintered compact. The silicon nitride sintered compact is mainly composed of silicon nitride crystal grains (crystalline phases) and a grain boundary phase. The rare earth element added to the silicon nitride sintered compact as the sintering aid are not particularly limited, but lanthanoide elements such as yttrium (Y), lanthanum (La), cerium (Ce), samarium (Sm), neodymium (Nd), dysprosium (Dy), erbium (Er) and the like are preferably applied. The rare earth element is added, for example, as oxide, nitride, boride, carbide, silicide or the like. A rare earth compound as the sintering aid is desirably oxide of at least one selected from Y, Ce, Sm, Nd and Er.

If the content of the rare earth element is less than 7 mass % in terms of oxide, it is impossible to sufficiently densify the silicon nitride sintered compact. Further, the ratio of the crystalline compound phases in the grain boundary phase decreases to fail to sufficiently enhance the thermal conductivity of the silicon nitride sintered compact. Since grain growth of the silicon nitride crystal grains is insufficient, sliding characteristics such as rolling life and so on cannot be sufficiently improved. If the content of the rare earth element exceeds 18 mass % in terms of oxide, the amount of the grain boundary phase in the silicon nitride sintered compact becomes excessive, so that the strength and thermal conductivity decrease. The content of the rare earth element preferably ranges from 8 to 14 mass % in terms of oxide.

Aluminum as the sintering aid serves to aid the function of the rare earth element as the sintering accelerator, and is added, for example, as aluminum oxide, aluminum nitride or the like. If the content of aluminum is less than 0.3 mass % in terms of oxide, the densification of the silicon nitride sintered compact can be insufficient. If the content of aluminum exceeds 4 mass % in terms of oxide, not only the grain boundary phase increases but also the thermal conductivity can decrease because aluminum forms a solid solution in the silicon nitride crystal grains. More preferably, the content of aluminum ranges from 0.7 to 2 mass % in terms of oxide.

The grain boundary phase generated based on the rare earth compound, the aluminum compound and so on generally exists as an amorphous phase, crystalline phase or a mixed phase thereof. In the silicon nitride sintered compact of this embodiment, the ratio of the crystalline compound phases in the grain boundary phase is set to 20% or more in area ratio. Increasing the ratio of the crystalline compound phases in the grain boundary phase makes it possible to enhance the thermal conductivity of the silicon nitride sintered compact. When the ratio of the crystalline compound phases in the grain boundary phase is less than 20% in area ratio, the thermal conductivity of the silicon nitride sintered compact decreases according to the relatively increasing amorphous phase. More preferably, the ratio of the crystalline compound phases is 30% or more in area ratio.

Further, the crystalline compound phases in the grain boundary phase has an average grain size of 0.5 μm or less. When the average grain size of the crystalline compound phases exceeds 0.5 μm, the mechanical strength, the sliding characteristics and so on become insufficient. More specifically, the crystalline compound phases contribute to the enhancement in thermal conductivity of the silicon nitride sintered compact but is inferior in mechanical strength to the silicon nitride crystal grain or the amorphous grain boundary phase, so that the mechanical strength, the sliding characteristics and so on of the silicon nitride sintered compact will become impaired if the crystalline compound phases grow too large. Hence, the average grain size of the crystalline compound phases in the grain boundary phase is set to 0.5 μm or less. More preferably, the average grain size of the crystalline compound phases is set to 0.3 μm or less.

In addition to setting the average grain size of the crystalline compound phases in the grain boundary phase to 0.5 μM or less, the maximum grain size thereof is preferably set to 1 μm or less. If a crystalline compound phase having a maximum grain size greater than 1 μm exists in the grain boundary phase of the silicon nitride sintered compact, a crack easily occur starting therefrom. Therefore, the rolling life and so on can decrease when the silicon nitride sintered compact is used as a sliding member. As described above, setting the average grain size of the crystalline compound phases in the grain boundary phase to 0.5 μm or less makes it possible to enhance the thermal conductivity of the silicon nitride sintered compact without impairing the mechanical strength, the sliding characteristics and so on. Further, setting the maximum grain size of the crystalline compound phases to 1 μm or less makes it possible to improve the sliding characteristics and so on of the silicon nitride sintered compact with good repeatability.

The ratio of the crystalline compound phases in the grain boundary phase and the average grain size of the crystalline compound phases which have been described above can be realized by controlling the sintering step of the silicon nitride sintered compact in addition to adjustment of the kinds and the addition amounts of the sintering aids as described later in detail. For example, the cooling rate of the silicon nitride sintered compact immediately after the sintering process is preferably set to 100° C./h or lower. Preferably, the sintering step of the silicon nitride sintered compact is implemented such that primary sintering by pressureless sintering, atmosphere pressure sintering or the like and secondary sintering by HIP or the like are performed in combination. More preferably, the cooling rate is set to 50° C./h or lower. The ratio of the crystalline compound phases in the grain boundary phase is obtained by the XRD analysis or the image analysis of a magnified photograph. The average grain size and the maximum grain size of the crystalline compound phases are measured as follows. First, a magnified photograph of an arbitrary surface or section of the silicon nitride sintered compact is taken, and the magnified photograph is subjected to image processing to measure the grain size of the crystalline compound phase. Such measurement is implemented at four arbitrary locations, and the average value of them is regarded as the average grain size of the crystalline compound phases. The maximum value of the grain sizes measured at the four locations is regarded as the maximum grain size. The field of view of 50×50 μm is preferably magnified 1000 times or more for the magnified photograph. For taking the magnified photograph, an electron microscope, XDS, EPMA or the like is generally used.

The silicon nitride sintered compact constituting the sliding member of this embodiment further contains at least one element M selected from Ti, Zr, Hf, Mg, V, Nb, Ta, Cr, Mo and W in an amount of 0.1 to 3 mass % in terms of oxide. The element M is added, for example, as oxide, carbide, nitride, silicide, boride or the like to the silicon nitride sintered compact. The compound of element M (M compound) serves as a sintering aid, an improver for the mechanical characteristics or the like. For example, the M compound can be dispersed in the silicon nitride sintered compact to obtain the dispersion strengthening effect. This makes it possible to improve the mechanism strength, the rolling file and so on of the silicon nitride sintered compact.

In order to obtain the effect of improving the mechanical characteristics of the silicon nitride sintered compact, the content of the element M is set to 0.1 mass % or more in terms of oxide. A content of the element M less than 0.1 mass % in terms of oxide cannot sufficiently increase the durability and so on of the sliding member composed of the silicon nitride sintered compact. A content of the element M more than 3 mass % in terms of oxide also decreases the mechanical strength, the rolling life and soon. Further, the thermal conductivity of the silicon nitride sintered compact can decrease. The content of the element M is more preferably set to 0.5 to 2 mass % in terms of oxide.

Preferably, one element or two or more elements is/are selected from compounds of Zr, Hf, Mo, Mg, Ti, and Ta as the M compound(s). The compounds (oxides or the like) of Zr, Hf, Mo, or Mg directly exhibit an effect on crystallization of the grain boundary phase. The compounds of Ti and Ta serve as a nucleus of crystal and therefore promote crystallization of components of the grain boundary phase existing around the nucleus. These make it possible to increase the ratio of the crystalline compound phases in the grain boundary phase.

More preferably, two or more elements are selected from compounds of Zr, Hf, Mo, Mg, Ti and Ta as the M compounds. Use of the two or more M compounds increases the effect of promoting the crystallization of the grain boundary phase. Therefore, the effect based on the above-described control of the cooling rate becomes easily obtained. The increase in effect of promoting the crystallization facilitates the control of the grain boundary phase and thereby facilitates the control of the size (the average grain size, the maximum grain size) of the crystalline compound phases in the grain boundary phase. Further, the possibility of the control of the grain boundary phase facilitates the control of the shape and size of the silicon nitride crystal grain. In other words, the controllability of both the crystal size of the grain boundary phase and the crystal size of the silicon nitride crystal grain is improved.

The total amount of the sintering aids and the additives to be contained in the silicon nitride sintered compact is preferably set to 20 mass % or less in terms of oxide. A total amount of the sintering aids and the additives mode than 20 mass % can decrease the characteristics such as the mechanism strength, the abrasion resistance and so on which are inherent in the silicon nitride sintered compact. A small amount of compounds, other than the rare earth compound, the aluminum compound, and the M compound(s), and elements which never impairs the characteristics of the sliding member of this embodiment is permitted to be added to the silicon nitride sintered compact. Even in such a case, the total addition amount is preferably set to 20 mass % or less in terms of oxide.

Further, the total content of Li, Na, K, Ca, Sr, Ba, Fe, Mn and B as impurity positive ion elements is set to 0.3 mass % or less in the silicon nitride sintered compact of this embodiment. Since the impurity positive ion elements are factors of decreasing the thermal conductivity of the silicon nitride sintered compact, the total content of the impurity positive ion elements needs to be decreased in order to increase the thermal conductivity of the silicon nitride sintered compact. An amount (total amount) of the impurity positive ion elements in the silicon nitride sintered compact exceeding 0.3 mass % makes it impossible to realize a silicon nitride sintered compact having a thermal conductivity of 60 W/m·K or higher. The total content of the impurity positive ion elements is preferably set to 0.1 mass % or less.

The silicon nitride sintered compact having a reduced total content of impurity positive ion elements can be obtained by reducing impurity positive ion elements in a silicon nitride powder which is used as a raw material of the silicon nitride sintered compact. In particular, it is preferable to use, as the raw material powder, a silicon nitride powder having a total amount of Li, Na, K, Ca, Sr, Ba, Fe, Mn and B of 0.3 mass % or less and containing α-type silicon nitride having excellent sinterability of 90 mass % or more. Further, the silicon nitride powder used as the raw material preferably has an oxygen content of 1.5 mass % or less. If the oxygen content of the silicon nitride powder is excessive, the silicon nitride sintered compact produced using that silicon nitride powder can decrease in thermal conductivity and the like.

The silicon nitride sintered compact preferably has a porosity of 0.1% or less. A porosity of the silicon nitride sintered compact greater than 0.1% decreases the mechanical strength, the rolling life and so on. Further, relating to the microstructure of the silicon nitride sintered compact, in addition to the structure of the grain boundary phase, it is preferable to set the ratio of columnar grains having an aspect ratio of 2 or greater in the silicon nitride crystal grains to 50% or more in area ratio. The silicon nitride sintered compact can be composed of columnar (needle-shaped) silicon nitride crystal grains to improve the mechanical strength, the rolling life and so on. The ratio of the needle-shaped silicon nitride crystal grains having an aspect ratio of 2 or greater is preferably 70% or more, and, more preferably 90% or more.

However, when the columnar silicon nitride crystal grains abnormally grow such that the maximum length thereof exceeds 40 μm, the grains will be factors that deteriorate the surface property of the silicon nitride sintered compact. Due to the deterioration, the sliding characteristics and the abrasion resistance represented by the rolling life tend to deteriorate. Therefore, the maximum length of the needle-shaped silicon nitride crystal grains is preferably set to 40 μm or less. The aspect ratio and the maximum length of the silicon nitride crystal grains are controlled by the raw material powder and the raw material composition of the silicon nitride sintered compact, and the conditions of the sintering step.

The aspect ratio and the maximum length of the silicon nitride crystal grains are measured as follows. First, an arbitrary surface or section of the silicon nitride sintered compact is etched to elute the aid component, and a magnified photograph is then taken. The sizes and the number of the silicon nitride crystal grains existing in the magnified photograph are measured to calculate the aspect ratios and the maximum length. Such measurement is implemented at four arbitrary locations, and the average value of them is regarded as the ratio of columnar grains. Further, the maximum value of the grain sizes measured at the four locations is regarded as the maximum length. The field of view of 50×50 μm is preferably magnified 1000 times or more for the magnified photograph. For taking the magnified photograph, an electron microscope, XDS, EPMA or the like is generally used.

The silicon nitride sintered compact constituting the sliding member of this embodiment has a thermal conductivity of 60 W/m·K or higher based on the ratio of the crystalline compound phases in the grain boundary phase, the average grain size of the crystalline compound phases, the content of the impurity positive ion elements and so on. Application of the silicon nitride sintered compact having a thermal conductivity of 60 W/m K or higher to the sliding member allows heat generated by the sliding to be efficiently released to the outside. Accordingly, it becomes possible to improve the characteristics, stability, reliability and so on of various parts and machines using the sliding member of this embodiment. When the thermal conductivity of the silicon nitride sintered compact is less than 60 W/m·K, the sliding member will be insufficient in heat release performance.

The silicon nitride sintered compact satisfies hardness of 1300 to 1500 in Vickers hardness Hv and toughness of 5.0 MP·m$^{1/2}$ or more in fracture toughness value as well as the thermal conductivity. In other words, it becomes possible to provide a sliding member having both durability and heat release performance. If the Vickers hardness Hv of the silicon nitride sintered compact is less than 1300 or the fracture toughness value is less than 5.0 MPa·m$^{1/2}$, the characteristics as the sliding member deteriorate. If the Vickers hardness Hv of the sliding member exceeds 1500, its attackability against the mating material becomes prominent.

Further, the silicon nitride sintered compact preferably has a three-point bending strength (the deflective strength in the three-point bending test) of 650 MPa or more, and a crushing strength of 150 N/mm$^2$ or more. Application of such a silicon nitride sintered compact can further increase the characteristics as the sliding member. Note that the Vickers hardness shall indicate the result of a test performed with a test load of 198.1 N based on the measuring method specified in JIS-R-1610. The fracture toughness value is measured based on the IF method specified in JIS-R-1607 and calculated by Equation of Niihara. The crushing strength shall be obtained by applying a compression weight using an Instron type testing machine by the measuring method conforming to the old JIS standard B1501 and measuring the load at breakage.

The silicon nitride sintered compact constituting the sliding member of this embodiment is produced, for example, as follows. First, a silicon nitride powder is prepared. The silicon nitride powder preferably has a content (total amount) of impurity positive ion elements of 0.3 mass % or less, an oxygen content of 1.5 mass % or less, and α-type silicon nitride of 90 mass % or more. To such a silicon nitride powder, a predetermined amount of the rare earth compound powder, the aluminum compound powder and the M compound powder is added, and an organic binder and a dispersion medium are further added, and all of them are sufficiently mixed and compacted into a desired shape by applying a known compacting method such as uniaxial pressing, rubber pressing, CIP or the like.

Next, the compact is subjected to degreasing treatment and then sintered at a temperature of 1600 to 2000° C. in an inert atmosphere such as a nitrogen atmosphere, an Ar atmosphere or the like to form a silicon nitride sintered compact. For the sintering step, sintering methods such as pressureless sintering, atmosphere pressure sintering, hot press, HIP (Hot Isostatic Press) and the like are applicable. A plurality of methods may be combined, such as HIP processing being performed after pressureless sintering. In particular, in the case where the silicon nitride sintered compact is applied to a bearing member such as a bearing ball, it is effective to perform HIP processing as the secondary sintering after the primary sintering by the pressureless sintering or the atmosphere pressure sintering. The HIP processing is preferably performed by keeping the silicon nitride sintered compact under a pressure of 30 MPa or higher at a temperature of 1600 to 1900° C. for a predetermined period.

The silicon nitride sintered compact of this embodiment is preferably produced by applying a manufacturing method in which the primary sintering and the secondary sintering are combined. First, the compact is subjected to the pressureless sintering or atmosphere pressure sintering at a temperature of 1600 to 2000° C. as the primary sintering. After the primary sintering, the resulting compact is subjected to slow cooling at a cooling rate of 100° C./h or lower down to the temperature at which the grain boundary phase solidifies. Subsequently, the resulting compact is subjected to HIP processing at a temperature of 1600 to 1900° C. as the secondary sintering. The resulting compact is also subjected to slow cooling at a cooling rate of 100° C./h or lower. Setting the cooling rate after the primary sintering and the secondary sintering to 100° C./h or lower makes it possible to crystallize the grain boundary phase. Further, the grain growth of the crystalline compound phases in the grain boundary phase can be suppressed.

The cooling rate after the primary sintering and the secondary sintering is preferably set to 50° C./h or lower. This makes it possible to further suppress the grain growth of the crystalline compound phases. In the case where the slow cooling is not performed after the sintering, the cooling rate is generally about 600° C./h. At such a cooling rate, the grain boundary phase becomes vitrified to fail to increase the ratio of the crystalline compound phases in the grain boundary phase. Note that a too-low cooling rate decreases the manufacturability of the silicon nitride sintered compact, and therefore the cooling rate is preferably set to 10° C./h or higher. Further, the secondary sintering temperature set to be lower than the first sintering temperature can suppress grain growth of the silicon nitride crystal grains and the crystalline compound phases in the grain boundary phase.

Application of such manufacturing conditions makes it possible to crystallize the grain boundary phase existing in the silicon nitride sintered compact while making the grain boundary phase finer. In other words, a silicon nitride sintered compact can be obtained which has a ratio of the crystalline compound phases in the grain boundary phase of 20% or more in area ratio, an average grain size of the crystalline compound phases in the grain boundary phase of 0.5 μm or less, and a maximum grain size of the crystalline compound phases of 1 μm or less. As for the shape of the silicon nitride crystal grain, its maximum length can be made 40 μm or less. Accordingly, a silicon nitride sintered compact can be obtained which has an improved thermal conductivity of 60 W/m·K or higher while keeping the mechanical strength, the abrasion resistance and the sliding characteristics which are inherent in the silicon nitride sintered compact.

The sliding member of this embodiment is applied to engine parts such as bearing member, rolling roll material, vane for compressor, gas turbine blade, cam roller and so on. The sliding member is effective in particular to a bearing member (a rolling element or the like) such as a bearing ball among of them. Note that, in addition to them, the silicon nitride sintered compact of the above-describe embodiment can also be used as a heater cover, a cutting tool and the like. The bearing according to the embodiment of the present invention has a rolling element composed of the sliding member (the silicon nitride sintered compact) of the above-described embodiment, for example, a bearing ball.

Figure 1:
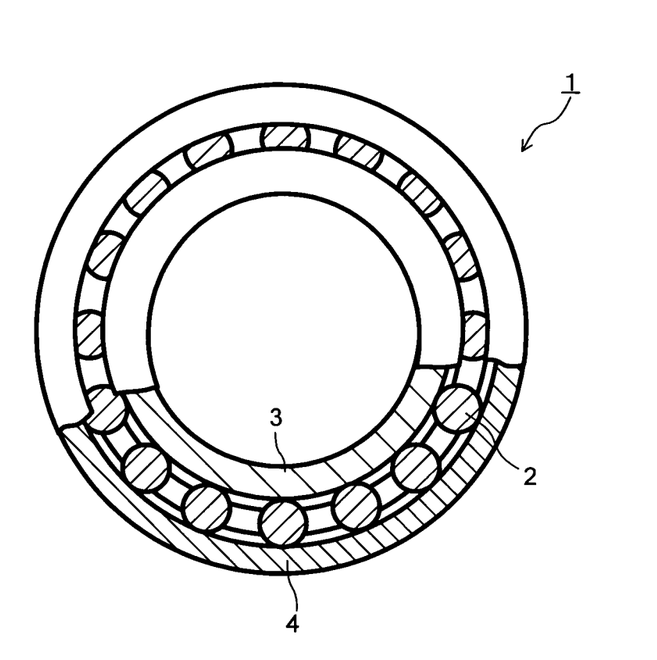
FIG. 1 is a view showing a configuration of a bearing according to an embodiment of the present invention, in a partial sectional view.

FIG. 1 shows a configuration of a bearing according to the embodiment of the present invention. The bearing 1 shown in FIG. 1 has a plurality of bearing balls 2 composed of the sliding member of the above-described embodiment, and an inner ring 3 and an outer ring 4 which support the bearing balls 2. The inner ring 3 and the outer ring 4 are concentrically arranged about the rotation center. The basic configuration of the bearing 1 is similar to that of a standard bearing. The inner ring 3 and the outer ring 4 are preferably formed of bearing steel such as SUJ2 or the like specified in JIS-G-4805, whereby reliable high-speed rotation can be obtained.

As described above, the bearing ball 2 composed of the silicon nitride sintered compact (sliding member) is excellent in heat release performance in addition to the sliding characteristics such as the rolling life and so on. Accordingly, the heat generated when the rotation shaft equipped with the bearing 1 is rotated at a high speed can be efficiently released to the outside. This makes it possible to eliminate the trouble due to insufficient heat dissipation while keeping the durability and reliability based on the rolling life and so on of the bearing ball 2. Such a bearing 1 is preferably used for various devices whose rotation shaft is rotated at a high speed, for example, electronic devices such as a magnetic recorder such as an HDD and an optical disk device such as a DVD and so on.

Next, concrete examples of the present invention and their evaluation results will be described.

EXAMPLE 1

First, a silicon nitride powder was prepared which has an oxygen content of 1.3 mass %, a total content of Li, Na, K, Fe, Ca, Sr, Ba, Fe, Mn and B as impurity positive ion elements of 0.15 mass %, a ratio of an α-type silicon nitride of 97 mass %, and an average grain size of 0.55 μm. An yttrium oxide powder having an average grain size of 0.7 μm in an amount of 7 mass %, an aluminum oxide powder having an average grain size of 0.5 μm in an amount of 2 mass %, and a $HfO_2$ powder having an average grain size of 1.0 μm in an amount of 2 mass % were added as the sintering aids, in this ratio, to this silicon nitride powder, and all of them were subjected to wet mixing for 72 hours in ethyl alcohol and then dried to prepare a raw material mixed powder.

Then, after a predetermined amount of organic binder was added to the above-described raw material mixed powder, a compact was produced by the CIP method. The resulting compact was degreased in airflow and then pressureless sintered at a temperature of 2000° C. in an inert atmosphere. After the pressureless sintering, the compact was subjected to slow cooling at 100° C./h. Further, HIP processing was performed on the sintered compact at a temperature of 1700° C. under a pressure of 100 MPa. After the HIP processing, the sintered compact was subjected to slow cooling at 100° C./h. In such a manner, a silicon nitride sintered compact was produced.

For the grain boundary phase in the resulting silicon nitride sintered compact, the ratio, the average grain size, and the maximum grain size of the crystalline compound phases were measured according to the above-described method. As a result, the ratio of the crystalline compound phases in the grain boundary phase (area ratio) was 28%, the average grain size of the crystalline compound phases was 0.3 μm, and the maximum grain size of the crystalline compound phases was 0.7 μm. Subsequently, the silicon nitride sintered compact was processed into a shape of a quadangular prism of 3×4×40 mm, and surface polishing corresponding to grade 3 of the bearing ball that is certified by JIS standard was performed on its surface. Such a sample was subjected to a later-described characteristic evaluation.

EXAMPLES 2 to 17

Sintering aids in respective compositions shown in Table 1 were added to silicon nitride powders (the ratio of α-type silicon nitride: 97 mass %, the average grain size: 0.55 μm) shown in Table 1 and then mixed similarly to Example 1 to prepare the raw material mixed powders, respectively. A predetermined amount of organic binder was mixed into each of the raw material mixed powders and mixed together, and then compacted by the CIP method. The resulting compacts were degreased in airflow and then pressureless sintered in an inert atmosphere. Further, HIP processing was performed on the pressureless sintered compacts to obtain objective silicon nitride sintered compacts.

The conditions of the temperature and the cooling rate at the pressureless sintering, and the temperature and the cooling rate at the HIP processing were those shown in Table 2, respectively. For the grain boundary phase of the silicon nitride sintered compacts, the ratio, the average grain size, and the maximum grain size of the crystalline compound phases were measured. The measurement results areas shown in Table 2. The silicon nitride sintered compacts were subjected to the same surface polishing similarly to Example 1, and subjected to the later-described characteristic evaluation.

COMPARATIVE EXAMPLES 1 to 3

A silicon nitride sintered compact (Comparative Example 1) was produced similarly to Example 1 except that the addition amount of yttrium oxide powder as the sintering aid was 6 mass %. A silicon nitride sintered compact (Comparative Example 2) was produced similarly to Example 1 except that the M compound powder was not added. A silicon nitride sintered compact (Comparative Example 3) was produced similarly to Example 1 except that a silicon nitride powder having an amount of impurity positive ion elements of 0.35 mass % was used. For the grain boundary phases in the resulting silicon nitride sintered compacts, the ratio, the average grain size, and the maximum grain size of the crystalline compound phases were measured. The measurement results are as shown in Table 2. Further, the silicon nitride sintered compacts were subjected to the later-described characteristic evaluation.

TABLE 1

| | Silicon nitride powder | | Sintering aid composition | | |
|---|---|---|---|---|---|
| | Impurity positive ion element amount (mass %) | Oxygen content (mass %) | Rare earth compound Kind (addition amount/ mass %) | Al compound Kind (addition amount/ mass %) | M compound Kind (addition amount/ mass %) |
| Example 1 | 0.15 | 1.3 | $Y_2O_3$(7) | $Al_2O_3$(2) | $HfO_2$(2) |
| Example 2 | 0.15 | 1.3 | $Y_2O_3$(8) | $Al_2O_3$(1.5) | $Mo_2O_3$(2) |
| Example 3 | 0.15 | 1.3 | $Y_2O_3$(9) | $Al_2O_3$(1) | $HfO_2$(2) |
| Example 4 | 0.15 | 1.3 | $Y_2O_3$(10) | $Al_2O_3$(0.7) | $HfO_2$(2) |
| Example 5 | 0.15 | 1.3 | $Er_2O_3$(7) | $Al_2O_3$(2) | $HfO_2$(2) |
| Example 6 | 0.15 | 1.3 | $Er_2O_3$(8) | $Al_2O_3$(1.5) | $Mo_2O_3$(2) |
| Example 7 | 0.15 | 1.3 | $Er_2O_3$(9) | $Al_2O_3$(1) | $HfO_2$(2) |
| Example 8 | 0.15 | 1.3 | $Er_2O_3$(10) | $Al_2O_3$(0.7) | $HfO_2$(2) |
| Example 9 | 0.05 | 1.3 | $Y_2O_3$(10) | $Al_2O_3$(2) | $HfO_2$(2) |
| Example 10 | 0.05 | 1.3 | $Er_2O_3$(10) | $Al_2O_3$(2) | $HfO_2$(2) |
| Example 11 | 0.05 | 1.3 | $Y_2O_3$(7) | $Al_2O_3$(2) | $Mo_2O_3$(2) + MgO(1) |
| Example 12 | 0.05 | 1.3 | $Y_2O_3$(8) | $Al_2O_3$(1.5) | $HfO_2$(2) + $TiO_2$(0.5) + MgO(0.3) |
| Example 13 | 0.05 | 1.3 | $Y_2O_3$(9) | $Al_2O_3$(1) | $Mo_2O_3$(1) + $TiO_2$(0.5) |
| Example 14 | 0.05 | 1.3 | $Er_2O_3$(7) | $Al_2O_3$(2) | $Mo_2O_3$(2) + $TiO_2$(0.2) + MgO(0.5) |
| Example 15 | 0.05 | 1.3 | $Er_2O_3$(8) | $Al_2O_3$(1.5) | $HfO_2$(1.5) + $TiO_2$(0.5) + MgO(0.3) |
| Example 16 | 0.05 | 1.3 | $Er_2O_3$(9) | $Al_2O_3$(1) | $Mo_2O_3$(2) + MgO(1) |
| Example 17 | 0.05 | 1.3 | $Y_2O_3$(10) | $Al_2O_3$(0.7) | $Mo_2O_3$(2) + MgO(0.3) |
| Comparative Example 1 | 0.15 | 1.3 | $Y_2O_3$(6) | $Al_2O_3$(2) | $HfO_2$(2) |

TABLE 1-continued

|  | Silicon nitride powder | | Sintering aid composition | | |
|---|---|---|---|---|---|
|  |  |  | Rare earth |  |  |
|  | Impurity positive ion element amount (mass %) | Oxygen content (mass %) | compound Kind (addition amount/ mass %) | Al compound Kind (addition amount/ mass %) | M compound Kind (addition amount/ mass %) |
| Comparative Example 2 | 0.15 | 1.3 | $Y_2O_3$(6) | $Al_2O_3$(2) | — |
| Comparative Example 3 | 0.35 | 1.3 | $Y_2O_3$(6) | $Al_2O_3$(2) | $HfO_2$(2) |

TABLE 2

|  | Manufacturing conditions of silicon nitride sintered compact | | | | Crystalline compound phases in grain boundary phase | | |
|---|---|---|---|---|---|---|---|
|  | Primary sintering | | Secondary sintering | | Ratio of crystalline phases (%) | Average grain size of crystalline phases (μm) | Maximum grain size of crystalline phases (μm) |
|  | Temperature (° C.) | Cooling temperature (° C./h) | Temperature (° C.) | Cooling temperature (° C./h) |  |  |  |
| Example 1 | 2000 | 100 | 1700 | 100 | 28 | 0.3 | 0.7 |
| Example 2 | 1975 | 100 | 1700 | 100 | 38 | 0.4 | 0.8 |
| Example 3 | 1950 | 100 | 1700 | 100 | 52 | 0.5 | 0.8 |
| Example 4 | 1925 | 100 | 1700 | 100 | 63 | 0.5 | 0.9 |
| Example 5 | 2000 | 100 | 1700 | 100 | 30 | 0.3 | 0.7 |
| Example 6 | 1975 | 100 | 1700 | 100 | 41 | 0.4 | 0.8 |
| Example 7 | 1950 | 100 | 1700 | 100 | 53 | 0.5 | 0.8 |
| Example 8 | 1925 | 100 | 1700 | 100 | 61 | 0.5 | 0.9 |
| Example 9 | 1925 | 100 | 1700 | 100 | 60 | 0.4 | 0.8 |
| Example 10 | 1925 | 100 | 1700 | 100 | 62 | 0.4 | 0.8 |
| Example 11 | 2000 | 50 | 1700 | 50 | 75 | 0.3 | 0.7 |
| Example 12 | 1975 | 50 | 1700 | 50 | 78 | 0.3 | 0.8 |
| Example 13 | 1950 | 50 | 1700 | 50 | 80 | 0.3 | 0.8 |
| Example 14 | 2000 | 50 | 1700 | 50 | 73 | 0.3 | 0.7 |
| Example 15 | 1975 | 50 | 1700 | 50 | 75 | 0.3 | 0.8 |
| Example 16 | 1950 | 50 | 1700 | 50 | 77 | 0.3 | 0.8 |
| Example 17 | 1925 | 30 | 1700 | 30 | 83 | 0.3 | 0.8 |
| Comparative Example 1 | 2000 | 100 | 1700 | 100 | 18 | 0.8 | 1.1 |
| Comparative Example 2 | 2000 | 100 | 1700 | 100 | 5 | 0.8 | 1.3 |
| Comparative Example 3 | 2000 | 100 | 1700 | 100 | 15 | 0.8 | 1.5 |

For the samples in Examples 1 to 17 and Comparative Examples 1 to 3, the ratio, the Vickers hardness, the fracture toughness value, the deflective strength, the crushing strength, and the thermal conductivity were measured. The thermal conductivity was measured by the laser flash method. The other characteristics were measured according to the above-described methods. For the deflective strength, the minimum value of the three-point bending strength (at room temperatures) is shown. These measurement results are shown in Table 3.

TABLE 3

|  | Characteristics of silicon nitride sintered compact | | | | |
|---|---|---|---|---|---|
|  | Vickers hardness (Hv) | Fracture toughness value (MPa·$m^{1/2}$) | Deflective strength (MPa) | Crushing strength (N/$mm^2$) | Thermal conductivity (W/m·K) |
| Example 1 | 1450 | 6.5 | 845 | 230 | 61 |
| Example 2 | 1440 | 6.6 | 813 | 211 | 73 |
| Example 3 | 1420 | 6.8 | 781 | 182 | 82 |

TABLE 3-continued

Characteristics of silicon nitride sintered compact

| | Vickers hardness (Hv) | Fracture toughness value (MPa·m$^{1/2}$) | Deflective strength (MPa) | Crushing strength (N/mm$^2$) | Thermal conductivity (W/m·K) |
|---|---|---|---|---|---|
| Example 4 | 1400 | 7.0 | 755 | 151 | 92 |
| Example 5 | 1450 | 6.6 | 832 | 215 | 63 |
| Example 6 | 1450 | 6.6 | 815 | 201 | 71 |
| Example 7 | 1450 | 6.7 | 790 | 173 | 85 |
| Example 8 | 1470 | 6.9 | 731 | 153 | 90 |
| Example 9 | 1400 | 7.0 | 903 | 231 | 65 |
| Example 10 | 1400 | 7.0 | 890 | 229 | 67 |
| Example 11 | 1390 | 7.0 | 751 | 225 | 72 |
| Example 12 | 1385 | 7.0 | 747 | 207 | 84 |
| Example 13 | 1381 | 7.1 | 744 | 181 | 88 |
| Example 14 | 1392 | 7.0 | 753 | 228 | 75 |
| Example 15 | 1387 | 7.0 | 748 | 210 | 83 |
| Example 16 | 1382 | 7.1 | 752 | 185 | 86 |
| Example 17 | 1380 | 7.2 | 735 | 233 | 89 |
| Comparative Example 1 | 1290 | 4.9 | 640 | 148 | 57 |
| Comparative Example 2 | 1290 | 4.7 | 635 | 143 | 40 |
| Comparative Example 3 | 1290 | 4.7 | 630 | 142 | 42 |

As is clear from Table 2 and Table 3, the ratio of the crystalline compound phases in the grain boundary phase needs to be 20% or more in order to improve the thermal conductivity of the silicon nitride sintered compact. Further, it is found that each of the silicon nitride sintered compacts according to Examples has a thermal conductivity of 60 W/m·K or more as well as excellent Vickers hardness, fracture toughness value, deflective strength, and crushing strength which affect the basic characteristics (the abrasion resistance and the sliding characteristics) when the silicon nitride sintered compact is used as a sliding member.

EXAMPLES 18 to 20

Silicon nitride sintered compacts were produced using a raw material mixed powder having the same composition as that of Example 1 under conditions shown in Table 4 respectively. The conditions other than those shown in Table 4 were the same as those in Example 1. The microstructure (the ratio of the crystalline compound phases in the grain boundary phase, the ratio of columnar grains having an aspect ratio of 2 or greater in the silicon nitride crystal grains, the maximum length of the columnar grains) of each of the silicon nitride sintered compacts was measured according to the above-described methods. These measurement results are shown in Table 4. The measurement was performed such that sections at four points of the sintered compact were selected and each of the sections was subjected to measurement in a visual field of magnification of 1000 times. The average values of the measurement results at four points are shown. Further, the characteristics of each of the silicon nitride sintered compacts were measured similarly to Example 1. These measurement results are shown in Table 5.

TABLE 4

| | Sintering conditions | | Silicon nitride sintered compact | | |
|---|---|---|---|---|---|
| | Sintering temperature (°C.) | HIP temperature (°C.) | Ratio of crystalline compound phases in grain boundary phase (%) | Ratio of columnar grains (%) | Maximum length of columnar grains (µm) |
| Example 1 | 2000 | 1700 | 28 | 95 | 48 |
| Example 18 | 1900 | 1800 | 28 | 90 | 35 |
| Example 19 | 1850 | 1700 | 25 | 65 | 30 |
| Example 20 | 1800 | 1600 | 22 | 50 | 20 |

TABLE 5 characteristics of silicon nitride sintered compact

| | Vickers hardness (Hv) | Fracture toughness value (MPa·m$^{1/2}$) | Deflective strength (MPa) | Crushing strength (N/mm$^2$) | Thermal conductivity (W/m·K) |
|---|---|---|---|---|---|
| Example 1 | 1450 | 6.5 | 845 | 230 | 92 |
| Example 18 | 1440 | 6.4 | 820 | 227 | 89 |
| Example 19 | 1450 | 6.0 | 820 | 215 | 75 |
| Example 20 | 1440 | 5.5 | 700 | 208 | 65 |

From Table 4 and Table 5, it is found that the ratio of columnar grains having an aspect ratio of 2 or greater in the silicon nitride crystal grains is preferably 50% or more in order to improve the mechanical characteristics (the hardness, the strength, the toughness) of the silicon nitride sintered compact. It is also found that the maximum length of the columnar grains is preferably 40 µm or less.

EXAMPLES 21 to 40

COMPARATIVE EXAMPLES 4 to 6

Bearing balls having diameter of 2 mm were produced using the silicon nitride sintered compacts produced with the same compositions and under the same conditions as those of Examples 1 to 20 and Comparative Examples 1 to 3. The surface of each of the bearing balls was subjected to surface polishing at grade 3. The rolling life of each of the bearing balls was measured as follows. The rolling life test was performed by rolling the bearing ball on a flat plate made of SUJ2 steel (mating material) using a thrust-type bearing testing machine. The rolling life was tested under a maximum contact stress of 5.9 Pa and at a number of rotations of 1200 rpm, and judged whether the bearing ball can be subjected to continuous test for 100 hours and 400 hours. These results are shown in Table 6.

TABLE 6

| | Silicon nitride sintered compact | Rolling fatigue life test | |
|---|---|---|---|
| | | Continuous testing for 100 hours | Continuous testing for 400 hours |
| Example 21 | Example 1 | ○ | ○ |
| Example 22 | Example 2 | ○ | ○ |
| Example 23 | Example 3 | ○ | ○ |
| Example 24 | Example 4 | ○ | ○ |
| Example 25 | Example 5 | ○ | ○ |

TABLE 6-continued

| | Silicon nitride sintered compact | Rolling fatigue life test | |
|---|---|---|---|
| | | Continuous testing for 100 hours | Continuous testing for 400 hours |
| Example 26 | Example 6 | ○ | ○ |
| Example 27 | Example 7 | ○ | ○ |
| Example 28 | Example 8 | ○ | ○ |
| Example 29 | Example 9 | ○ | ○ |
| Example 30 | Example 10 | ○ | ○ |
| Example 31 | Example 11 | ○ | ○ |
| Example 32 | Example 12 | ○ | ○ |
| Example 33 | Example 13 | ○ | ○ |
| Example 34 | Example 14 | ○ | ○ |
| Example 35 | Example 15 | ○ | ○ |
| Example 36 | Example 16 | ○ | ○ |
| Example 37 | Example 17 | ○ | ○ |
| Example 38 | Example 18 | ○ | ○ |
| Example 39 | Example 19 | ○ | ○ |
| Example 40 | Example 20 | ○ | ○ |
| Comparative Example 4 | Comparative Example 1 | x | x |
| Comparative Example 5 | Comparative Example 2 | x | x |
| Comparative Example 6 | Comparative Example 3 | x | x |

From Table 6, it is found that any of the ball bearings using the silicon nitride sintered compacts according to Examples has an excellent rolling fatigue life. Further, bearing were assembled using the bearing balls in Examples respectively, and each installed in a spindle motor for electronic equipment and subjected to actual machine test. As a result, it was verified that since the ball bearings are excellent in heat release performance as well as durability, it is possible to eliminate the trouble due to heat caused by the high speed rotation of the rotation shaft stored in the machine.

Any of the bearing balls (silicon nitride sintered compacts) according to Examples has a ratio of columnar grains having an aspect ratio of 2 or greater in the silicon nitride crystal grains of 50% or more in area ratio and a maximum length of the columnar grains of 40 μm or less. As in Examples 11 to 17, any of the silicon nitride sintered compacts using two or more M compounds has a ratio of columnar grains having an aspect ratio of 2 or greater in the silicon nitride crystal grains of 92% or more in area ratio and a maximum length of the columnar grains of 35 μm or less, which shows that the growth of coarse grains is effectively suppressed.

Industrial Applicability

The sliding member according to the aspect of the present invention is composed of a silicon nitride sintered compact having both sliding characteristics and a conductivity of 60 W/m·K or higher. Accordingly, a sliding member improved both in durability and heat release performance can be provided. A bearing using a rolling element composed of such a sliding member is excellent in durability, reliability and heat release performance, and therefore preferably used in various machines.

What is claimed is:

1. A sliding member comprising a silicon nitride sintered compact containing, as sintering aids, a rare earth element of 7 to 18 mass % in twins of oxide, aluminum of 0.3 to 4 mass % in terms of oxide, and at least one element M selected from Ti, Zr, Hf, Mg, V, Nb, Ta, Cr, Mo and W of 0.1 to 3 mass % in terms of oxide, and having a total content of Li, Na, K, Ca, Sr, Ba, Fe, Mn and B as impurity positive ion elements of 0.3 mass % or less, wherein the silicon nitride sintered compact comprises silicon nitride crystal grains and grain boundary phases comprise mainly the sintering aids, the grain boundary phases comprise crystalline compound phases generated by crystallizing a part of the grain boundary phases, and a ratio of the crystalline compound phases in the grain boundary phases is 20% or more in area ratio, wherein an average grain size of the crystalline compound phases which exist in the grain boundary phases is 0.5 μm or less, and a maximum grain size of the crystalline compound phases which exist in the grain boundary phases is 1 μm or less, wherein the silicon nitride crystal grains comprise columnar grains having an aspect ratio of 2 or greater, a ratio of the columnar grains in the silicon nitride crystal grains is 50% or more in area ratio, and a maximum length of the columnar grains is 40 μm or less, and wherein a porosity of the silicon nitride sintered compact is 0.1% or less, and a thermal conductivity of the silicon nitride sintered compact is 60 W/m·K or higher.

2. The sliding member according to claim 1, wherein the average grain size of the crystalline compound phases in the grain boundary phase is 0.3 μm or less.

3. The sliding member according to claim 1, wherein the silicon nitride sintered compact contains a total amount of the rare earth element and the element M of 20 mass % or less in terms of oxide.

4. The sliding member according to claim 1, wherein the silicon nitride sintered compact contains a total amount of the rare earth element, the aluminum, and the element M of 20 mass % or less in terms of oxide.

5. The sliding member according to claim 1, wherein the element M is at least one element selected from Ti, Zr, Hf, Mg, Ta, and Mo.

6. The sliding member according to claim 1, wherein the element M is two or more elements selected from Ti, Zr, Hf, Mg, Ta, and Mo.

7. The sliding member according to claim 1, wherein the silicon nitride sintered compact has a Vickers hardness of 1300 to 1500.

8. The sliding member according to claim 1, wherein the silicon nitride sintered compact has a fracture toughness value of 5.0 MPa·m$^{1/2}$ or more.

9. The sliding member according to claim 1, wherein the silicon nitride sintered compact has a three-point bending strength of 650 MPa or more.

10. The sliding member according to claim 1, wherein the silicon nitride sintered compact has a crushing strength of 150 N/mm$^2$ or more.

11. The sliding member according to claim 1, wherein the sliding member is a rolling element for a bearing.

12. A bearing comprising a rolling element composed of the sliding member according to claim 1.

13. The bearing according to claim 12, wherein the silicon nitride sintered compact has a maximum grain size of the crystalline compound phases in the grain boundary phase of 1 μm or less.

14. The bearing according to claim 12, wherein a porosity of the silicon nitride sintered compact is 0.1% or less.

15. The bearing according to claim 12, wherein the element M contained in the silicon nitride sintered compact is one element or two or more elements selected from Ti, Zr, Hf, Mg, Ta, and Mo.

* * * * *